Feb. 11, 1941.  E. V. GUNN  2,231,333
PAINT MASKING DEVICE
Filed Jan. 29, 1938
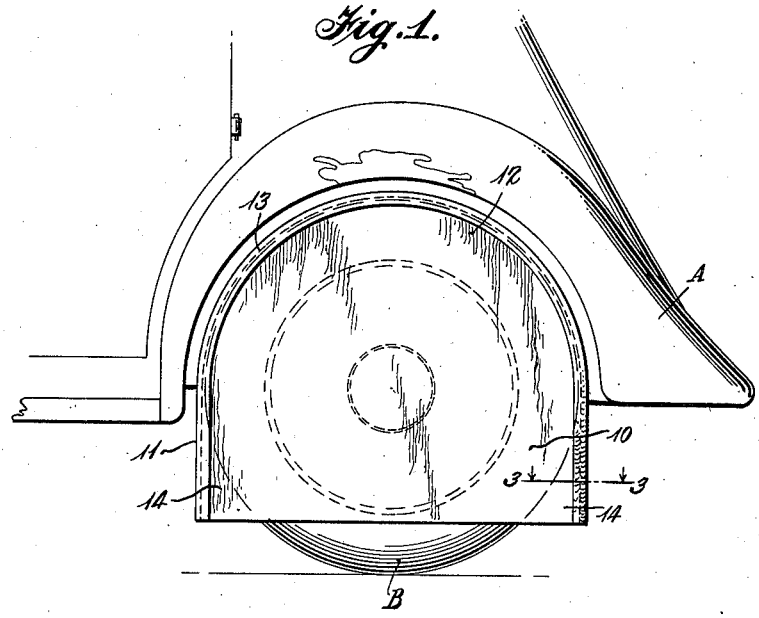
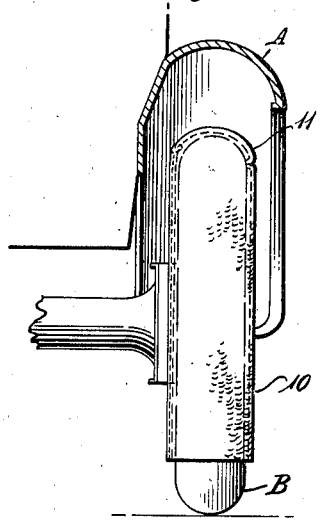
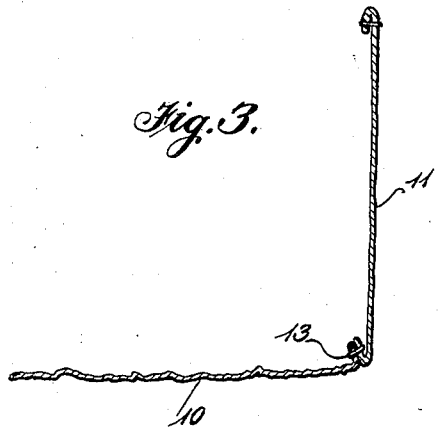
Inventor
Elbert V. Gunn
By Bacon & Thomas
Attorneys Patented Feb. 11, 1941

2,231,333

UNITED STATES PATENT OFFICE 2,231,333

PAINT MASKING DEVICE

Elbert V. Gunn, Tulsa, Okla.

Application January 29, 1938, Serial No. 187,736

2 Claims. (Cl. 91—65)

This invention relates to improvements in paint masking devices and, more particularly, is concerned with devices for protecting or masking vehicle wheels and tires while the fenders are being painted.

The ratio of automobile fender damage compared with damages to other portions of the ordinary automobile is quite high, and as a result thereof a preponderant proportion of the metal repairing and painting of automobiles because of accidents or the like is on the fenders thereof.

It is the common practice to repair and paint such fenders without removing them from the body portion of the vehicle whenever possible and it is also customary and convenient to repair and paint fenders without removing the wheel or tire. A difficulty with such practice, however, is that the wheel or wheel and tire very often becomes spotted or smeared with paint or the like which is applied to the fender and no satisfactory and convenient means has heretofore been provided for protecting or masking the wheel from the paint spray, water-sanding or the like, which is used during such fender finish or paint work.

It accordingly is a primary object of the present invention to provide a device which will remedy the above problem, and which will effectively mask the wheel and tire to protect the same from paint applied to its fender with the further result that the operator's work is greatly expedited in that no further precautions on his part are necessary to prevent the spray mist or overspray getting on the tire or wheel directly below the fender being painted or spot painted or to prevent the wheel and tire from becoming stained by water and sanded slush during water-sanding.

It is a further object of the invention to provide a wheel masking device which may be readily applied to a wheel and tire and maintained thereon in operative position.

A further object of the invention is to provide a mask which is expansible or adjustable to the extent that it may be employed with wheels or wheels and tires of varied diameters.

Another object of the invention is to provide a mask which is not only horizontally or laterally expansible but which is vertically reinforced to an extent which materially impedes any undesirable outward or upward turning or bending of the mask while the same is applied in operative position.

Another object is to provide a vehicle wheel mask which may, if desired, terminate short of the ground whereby a slight movement of the wheel to which the mask is operatively applied will not displace the mask out of its protective position.

Another object of the invention is to provide a masking device which may be formed of a single sheet of fibrous material which material may possess the expansible and/or reinforcing features above pointed out.

Another object is to provide a masking device which may be compactly folded when not in use whereby to facilitate shipping and storage thereof but which is durable to the extent that it is capable of abundant re-use.

Still another object and advantage of the invention is to provide a paint masking device which is extremely simple in construction, practical in operation and inexpensive in cost of manufacture.

Other and further advantages of the invention will be apparent from the following detailed description taken in conjunction with the accompanying drawing, wherein a preferred embodiment of the principles of the invention has been selected for exemplification.

In the drawing, Figure 1 is a side elevational view of a mask comprehended by the present invention as applied to the left rear wheel and tire of an automobile showing the fender thereof in damaged condition;

Figure 2 is a vertical section of Figure 1; and

Figure 3 is a horizontal section of the paint mask of Figure 1 taken on line 3—3.

Referring more particularly to the drawing wherein like numerals and letters refer to like parts, the letter A represents any conventional automobile fender which houses a wheel or wheel and tire indicated generally at B.

The mask which is shown as applied in operative position to the wheel B is indicated by numeral 10 and, as clearly illustrated, the upper portion 12 of the mask 10 is semi-circular to conform to the configuration of the wheel or tire and the sides 14 thereof depend downwardly of the wheel, preferably terminating short of the support upon which the vehicle wheel B rests.

Secured by stitching or other suitable means 13 to the upper and outer edges of the mask 10 and extending laterally thereof is a collar 11 which is adapted to fit over the periphery of the wheel or the tire so as to support the mask 10 in the operative position as shown wherein the mask entirely covers the outer faces of the wheel and tire.

The entire masking device may, if desired, be constructed of a single sheet of material shaped in the manner illustrated, or the mask 10 and its collar 11 may be constructed of separate sheets of the same or different materials. It is highly desirable, however, that both the mask and its collar be formed of waterproof material or material which is resistant to paint spray and mist as well as sandy slush to which the mask may be subjected during water-sanding treatment of the fender. Another highly desirable feature which may characterize the masking device is the capability of adjustment to wheels and tires of varied sizes so that it will be unnecessary to employ separate masking devices for wheels and tires of each of the greatly varied sizes now commonly employed. I have further found that the character of material employed in this form of the mask should materially prevent, or in the alternative, means should be provided for preventing, the mask 10 from turning or bending outwardly or upwardly while it is in operative position and subjected to paint spray or the like, whereby it might become displaced and its effectiveness thus destroyed.

While my invention contemplates broadly the provision of means for masking wheels during fender painting, it particularly contemplates a construction wherein the foregoing additional features of importance are present. For the material of which the mask 10 is formed, I prefer to use a pliant sheet of waterproof fibrous material which may be vertically corrugated, creped or wrinkled as illustrated in the cross sectional view of the member 10 in Figure 3 and which is capable of being stretched horizontally, or which is expansible in a substantially horizontal plane, whereby it may be employed with wheels of varying diameters with equal facility. The vertical corrugations or the like, in addition to permitting a horizontal expansion and contraction, further function to reinforce the mask in a vertical direction to the extent that any tendency thereof to turn or bend outwardly or upwardly, particularly while subjected to the spray, will be materially and effectively impeded.

While I may employ a similar material for the collar portion 11 I have found that best results are obtained where the collar 11 is of relatively non-expansible pliant fabric which is waterproofed in any suitable way and which is capable of readily conforming to the spherical surface of the tire or other wheel periphery. A suitable material for the collar 11 may be enameled drill or the like and my invention also contemplates that the mask 10 may be constructed of this material if desired. This form of mask is relatively more durable and more completely resistant to moisture than the fibrous material form, but, since the enameled drill or like material is relatively non-expansible, the mask should be of sufficient size to be applied to the largest wheels expected to be encountered whereupon it may also be draped or fitted over the smaller wheels.

A masking device formed as above described is capable of being compactly folded, whereby shipping and storage thereof is facilitated, and further, possesses such durability that the mask may be reused a great number of times.

The operation of my device is believed to be readily apparent from the foregoing. The masking device is merely unfolded from its compact shipping position and positioned upon the wheel B in the manner illustrated. All damaged portions of the fender may then be subjected to any of the usual finishing operations, such as water-sanding, paint spraying or the like, without any danger of the wheel and tire protected by the mask becoming in any manner stained or damaged. At the completion of the fender finishing operation, the mask may be readily moved from the wheel and re-used as many times as desired.

It is understood that the invention is not limited to the specific construction herein described and illustrated but only by the scope of the following claims:

What I claim is:

1. A masking device for protecting an automobile wheel and tire during fender painting which comprises, a mask of pliant, moisture resistant material adapted to shield the outer face of a wheel and its tire and a collar extending laterally of the mask above the bottom thereof, said collar having a semi-circular upper portion to engage the upper portion of the tire periphery whereby to support the mask in operative shielding position.

2. A masking device for protecting an automobile wheel and tire during fender painting which comprises, a mask of pliant enameled drill adapted to shield the outer face of a wheel and its tire and a collar extending laterally of the mask above the bottom thereof, said collar having a semi-circular upper portion to engage the upper portion of the tire periphery whereby to support the mask in operative shielding position.

ELBERT V. GUNN.